(12) United States Patent
Rennie

(10) Patent No.: US 8,396,820 B1
(45) Date of Patent: Mar. 12, 2013

(54) FRAMEWORK FOR GENERATING SENTIMENT DATA FOR ELECTRONIC CONTENT

(76) Inventor: Douglas Rennie, Sacramento, CA (US)

(*) Notice: Subject to any disclaimer, the term of this patent is extended or adjusted under 35 U.S.C. 154(b) by 314 days.

(21) Appl. No.: 12/769,315

(22) Filed: Apr. 28, 2010

(51) Int. Cl.
*G06F 17/21* (2006.01)
*G06F 17/30* (2006.01)
*G06N 5/02* (2006.01)

(52) U.S. Cl. ............... 706/47; 704/10; 707/794
(58) Field of Classification Search .................. None
See application file for complete search history.

(56) References Cited

U.S. PATENT DOCUMENTS

| | | | | |
|---|---|---|---|---|
| 6,721,734 | B1 * | 4/2004 | Subasic et al. | 1/1 |
| 7,171,349 | B1 * | 1/2007 | Wakefield et al. | 704/9 |
| 7,269,598 | B2 * | 9/2007 | Marchisio | 1/1 |
| 7,461,033 | B1 * | 12/2008 | McConnell et al. | 706/12 |
| 7,475,007 | B2 * | 1/2009 | Kanayama et al. | 704/9 |
| 7,526,466 | B2 * | 4/2009 | Au | 706/55 |
| 2008/0133488 | A1 * | 6/2008 | Bandaru et al. | 707/3 |
| 2008/0249764 | A1 * | 10/2008 | Huang et al. | 704/9 |
| 2009/0048823 | A1 * | 2/2009 | Liu et al. | 704/9 |

OTHER PUBLICATIONS

Fellbaum, Christiane and George Miller. WordNet: An Electronic Lexical Database (Language, Speech, and Communication), May 15, 1998, pp. 47-68.*

* cited by examiner

*Primary Examiner* — Jeffrey A Gaffin
*Assistant Examiner* — Mikayla Chubb
(74) *Attorney, Agent, or Firm* — Lowe Graham Jones PLLC

(57) ABSTRACT

Methods, systems, and techniques for generating sentiment data are provided. Example embodiments provide a Sentiment Thesaurus Framework (STF), which provides a sentiment vocabulary meeting a set of criteria and a sentiment thesaurus according to certain connectedness rules. In one embodiment, the STF provides the sentiment thesaurus by relating connected adjective word-senses to valid sentiment adjective word-senses. The degree of connectedness is limited to one shift in meaning from one adjective to another, which implies at most two non-satellite or axle adjectives between a valid sentiment and a related adjective word-sense.

31 Claims, 14 Drawing Sheets

| | 101 | 102 | 103 |
|---|---|---|---|
| 110a | Valid sentiment adj | Related adjective | Rule # |
| 110b | Valid sentiment adj | Related adjective | Rule # |
| 110c | Valid sentiment adj | Related adjective | Rule # |
| | Valid sentiment adj | Related adjective | Rule # |
| | Valid sentiment adj | Related adjective | Rule # |
| | Valid sentiment adj | Related adjective | Rule # |
| ⋮ | ... | ... | ... |
| | Valid sentiment adj | Related adjective | Rule # |
| | Valid sentiment adj | Related adjective | Rule # |
| | Valid sentiment adj | Related adjective | Rule # |
| | Valid sentiment adj | Related adjective | Rule # |
| | Valid sentiment adj | Related adjective | Rule # |
| | Valid sentiment adj | Related adjective | Rule # |
| | Valid sentiment adj | Related adjective | Rule # |
| 110n | Valid sentiment adj | Related adjective | Rule # |
| | 121i | 131i | 141i |

Sentiment Thesaurus

*Fig. 1*

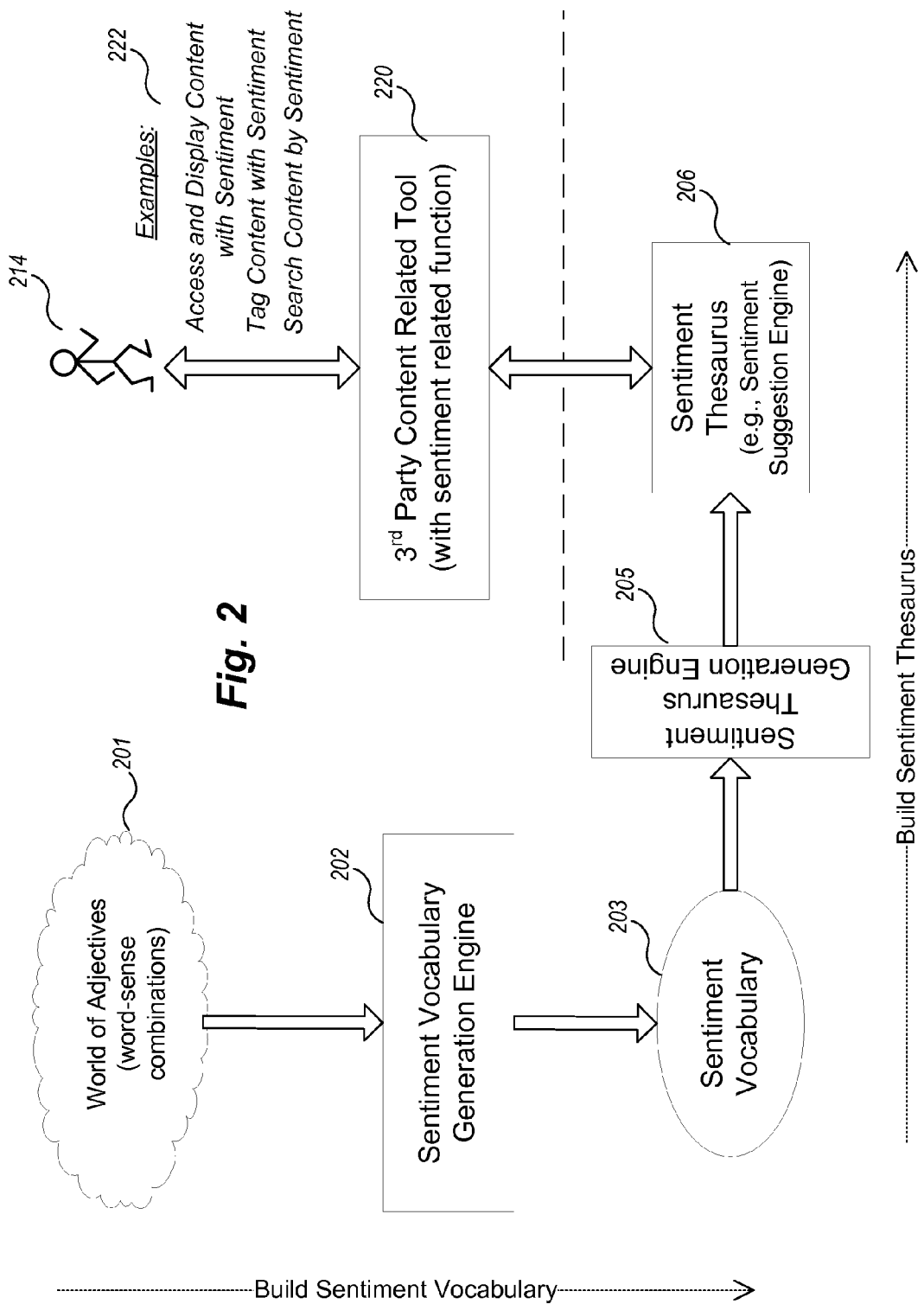

00763901 00 a 01 direct 2 013 ^ 01222360 a 0000 + 04871720 n 0105 ! 00766457 a 0101 & 00764301 a 0000 & 00766484 a 0000 & 00765173 a 0000 & 00765289 a 0000 & 00765410 a 0000 & 00765537 a 0000 & 00765666 a 0000 & 00765862 a 0000 & 00766102 a 0000 & 00766348 a 0000 | straightforward in means or manner or behavior or language or action; "a direct question"; "a direct response"; "a direct approach"

00764301 00 s 01 bluff 1 002 & 00763901 a 0000 + 04650913 n 0101 | bluntly direct and outspoken but good-natured; "a bluff but pleasant manner"; "a bluff and rugged natural leader"

00766484 00 s 09 blunt 0 candid 0 forthright 1 frank 0 free-spoken 0 outspoken 0 plainspoken 0 point-blank 0 straight-from-the-shoulder 0 007 & 00763901 a 0000 + 04650731 n 0602 + 04650731 n 0401 + 04871720 n 0404 + 04871720 n 0306 + 04871720 n 0203 + 04846383 n 0101 | characterized by directness in manner or speech; without subtlety or evasion; "blunt talking and straight shooting"; "a blunt New England farmer"; "I gave them my candid opinion"; "forthright criticism"; "a forthright approach to the problem"; "tell me what you think--and you may just as well be frank"; "it is possible to be outspoken without being rude"; "plainspoken and to the point"; "a point-blank accusation"

*Fig. 4A*

440 — 00765173 00 s 01 brutal 0 001 & 00763901 a 0000 | disagreeably direct and precise; "he spoke with brutal honesty"

441 — 00765289 00 s 01 flat-footed 1 002 & 00763901 a 0000 ;u 07075172 n 0000 | without reservation; "a flat-footed refusal"

442 — 00765410 00 s 01 man-to-man 0 001 & 00763901 a 0000 | forthright and honest; "had a man-to-man talk about the facts of life"

443 — 00765537 00 s 01 no-nonsense 0 001 & 00763901 a 0000 | not tolerating irrelevancies; "the no-nonsense tones of a stern parent"

444 — 00765666 00 s 02 plain 0 unvarnished 0 001 & 00763901 a 0000 | free from any effort to soften to disguise; "the plain and unvarnished truth"; "the unvarnished candor of old people and children"

445 — 00765862 00 s 01 pointed 0 002 & 00763901 a 0000 + 04919011 n 0101 | direct and obvious in meaning or reference; often unpleasant; "a pointed critique"; "a pointed allusion to what was going on"; "another pointed look in their direction"

*Fig. 4B*

446 — 00766102 00 s 03 square(a) 0 straightforward 0 straight 0 004 & 00763901 a 0000 + 04872016 n 0302 + 04867700 n 0202 + 04918498 n 0202 | without evasion or compromise; "a square contradiction"; "he is not being as straightforward as it appears"

447 — 00766348 00 s 01 upfront 0 001 & 00763901 a 0000 | frank and honest; "he was upfront about his intentions"

450 — 01222360 00 a 02 honest 0 honorable 4 012 ^ 00763901 a 0000 ^ 01115349 a 0000 ^ 01226240 a 0000 ^ 01309991 a 0000 ^ 02179279 a 0000 ^ 02318464 a 0000 ^ 02460502 a 0000 ^ 02464693 a 0000 + 04868748 n 0201 + 04871374 n 0102 ! 01222884 a 0101 & 01222722 a 0000 | not disposed to cheat or defraud; not deceptive or fraudulent; "honest lawyers"; "honest reporting"
(451, 452, 453, 454, 455)

457 — 01222722 00 s 01 downright 0 002 & 01222360 a 0000 + 04918498 n 0101 | characterized by plain blunt honesty; "a downright answer"; "a downright kind of person"

*Fig. 4C*

510 — 00556709 00 a 02 unconditional 0 unconditioned 1 004 ^ 01913715 a 0000 !
00555325 a 0101 & 00556881 a 0000 & 00557108 a 0000 | not conditional;
"unconditional surrender"
        511                                     512                513

515 — 00556881 00 s 03 blunt 0 crude(a) 0 stark(a) 0 002 & 00556709 a 0000 +
05124534 n 0301 | devoid of any qualifications or disguise or adornment; "the blunt
truth"; "the crude facts"; "facing the stark reality of the deadline"

516 — 00557108 00 s 01 vested 0 001 & 00556709 a 0000 | fixed and absolute and
without contingency; "a vested right"

520 — 01913715 00 a 01 unqualified 2 007 ^ 00556709 a 0000 ^ 01541013 a 0000 !
01913200 a 0101 & 01913931 a 0000 & 01914108 a 0000 & 01914250 a 0000 &
01914407 a 0000 | not limited or restricted; "an unqualified denial"

*Fig. 5A*

530 — 01913931 00 s 04 categoric 0 categorical 0 flat 0 unconditional 0 001 & 01913715 a 0000 | not modified or restricted by reservations; "a categorical denial"; "a flat refusal"

531 — 01914108 00 s 02 clean 0 clear 0 001 & 01913715 a 0000 | free of restrictions or qualifications; "a clean bill of health"; "a clear winner"

532 — 01914250 00 s 01 cool 0 002 & 01913715 a 0000 ;u 07075172 n 0000 | (used of a number or sum) without exaggeration or qualification; "a cool million bucks"

533 — 01914407 00 s 03 outright 0 straight-out 0 unlimited 0 001 & 01913715 a 0000 | without reservation or exception

*Fig. 5B*

|  |  | 730 | 740 | 750 | 760 | 770 |
|---|---|---|---|---|---|---|
| 701 |  | 00764484 | blunt | 00764484 | blunt | 1 |
|  | ⎧ | 00764484 | blunt | 00764484 | candid | 2 |
|  |  | 00764484 | blunt | 00764484 | forthright | 2 |
|  |  | 00764484 | blunt | 00764484 | frank | 2 |
|  |  | 00764484 | blunt | 00764484 | free-spoken | 2 |
|  |  | 00764484 | blunt | 00764484 | outspoken | 2 |
| 702 |  | 00764484 | blunt | 00764484 | plainspoken | 2 |
|  |  | 00764484 | blunt | 00764484 | point-blank | 2 |
|  | ⎩ | 00764484 | blunt | 00764484 | straight-from-the-shoulder | 2 |
| 703 |  | 00764484 | blunt | 00763901 | direct | 3 |
| 704 | ⎰ | 00764484 | blunt | 01222360 | honest | 6 |
|  | ⎱ | 00764484 | blunt | 01222360 | honorable | 6 |
| 705 |  | 00764484 | blunt | 01222722 | downright | 8 |
|  | ⎧ | 00764484 | blunt | 00764301 | bluff | 5 |
|  |  | 00764484 | blunt | 00765173 | brutal | 5 |
|  |  | 00764484 | blunt | 00765289 | flat-footed | 5 |
|  |  | 00764484 | blunt | 00765410 | man-to-man | 5 |
|  |  | 00764484 | blunt | 00765537 | no-nonsense | 5 |
|  |  | 00764484 | blunt | 00765666 | plain | 5 |
|  |  | 00764484 | blunt | 00765666 | unvarnished | 5 |
| 706 |  | 00764484 | blunt | 00765862 | pointed | 5 |
|  |  | 00764484 | blunt | 00766102 | square | 5 |
|  |  | 00764484 | blunt | 00766102 | straightforward | 5 |
|  |  | 00764484 | blunt | 00766102 | straight | 5 |
|  | ⎩ | 00764484 | blunt | 00766348 | upfront | 5 |
| 707 |  | 00556881 | blunt | 00556881 | blunt | 1 |
| 708 | ⎰ | 00556881 | blunt | 00556881 | crude | 2 |
|  | ⎱ | 00556881 | blunt | 00556881 | stark | 2 |
| 709 | ⎰ | 00556881 | blunt | 00556709 | unconditional | 3 |
|  | ⎱ | 00556881 | blunt | 00556709 | unconditioned | 3 |
| 710 |  | 00556881 | blunt | 01913715 | unqualified | 6 |
|  | ⎧ | 00556881 | blunt | 01913931 | categoric | 8 |
|  |  | 00556881 | blunt | 01913931 | categorical | 8 |
|  |  | 00556881 | blunt | 01913931 | flat | 8 |
|  |  | 00556881 | blunt | 01913931 | unconditional | 8 |
|  |  | 00556881 | blunt | 01914108 | clean | 8 |
| 711 |  | 00556881 | blunt | 01914108 | clear | 8 |
|  |  | 00556881 | blunt | 01914250 | cool | 8 |
|  |  | 00556881 | blunt | 01914407 | outright | 8 |
|  |  | 00556881 | blunt | 01914407 | straight-out | 8 |
|  | ⎩ | 00556881 | blunt | 01914407 | unlimited | 8 |
| 712 |  | 00556881 | blunt | 00557108 | vested | 5 |

Excerpt from Example Thesaurus

Fig. 7

FRAMEWORK FOR GENERATING SENTIMENT DATA FOR ELECTRONIC CONTENT

TECHNICAL FIELD

The present disclosure relates to methods, systems, and techniques for describing content using sentiment and, in particular, to methods, systems, and techniques for generating opinion data about content using a sentiment vocabulary and a sentiment thesaurus.

BACKGROUND

The barrage of electronic content available over a wide variety of information paths such as electronic retail sites and portals, search engines, electronic news and media services, corporate and private blog and news group postings, social networks etc. has lead to a growing need to filter, organize, categorize, and rank content in more intelligent ways. A typical individual connected online is confronted with more than what s/he can read or digest in a day, let alone an hour. In addition, finding particular types of content, products, and other information is difficult especially when one is not sure of what to search for, because the search results are over-extensive—often creating a problem of finding a needle in a haystack when trying to discover information.

Some social network sites, news, and other online environments support an ability for a user to tag content, typically with words that are nouns, to allow a user to categorize the content perhaps for finding it again in the future, sending to another colleague or friend, or for example, to create a shorthand label for further retrieval. These tags can act as placeholders or links for the content. Users can then use tools, for example, to retrieve all content tagged with a certain noun. One difficulty created by such solutions is that tagging something with a noun does not provide an ability for a user to express his or her opinion about that content; it rather simply allows the user to name that content. In order to express an opinion, typically a ranking mechanism needs to be concurrently provided. Such ranking systems, however, commonly lack uniformity and an ability to communicate to a downstream reader the logic used behind the rank.

Similarly, many online retail sites have created an ability for users to rank products and other offerings, so that other future purchasers, reviewers, etc. can hopefully gain useful insights as to whether such products or offerings would be suitable for their needs. Many such systems allow an extensive text field for hand written comments. These may be laborious and time consuming to read, but often do provide insight as to why the reviewer gave the product the rank s/he did. However, even with such comments available, these ranking systems are in the end limited by inconsistency as to the persons assigning ranking values. For example, a sixteen year old's "4 star" movie may not be the same as a sixty year old's. Thus, typically in the online world, there lack rules for indicating when something ought to be ranked one way versus another.

In addition, much content, for example, that present in news articles, personal blog postings, online reviews, corporate or public websites, inherently contains its own opinion about whatever is the subject of the content. For example, a news article may have a positive or negative slant on a topic. Such sentiment information can be helpful to people wishing to filter searches to exclude or include only certain types of information. For example, a person may only wish to look at positive reviews of a new movie that just hit the theatres. There is presently no accurate way to find out this information. Traditionally, information providers such as search engines have attempted to mine the content, for example, for the presence of certain negative or positive words, to help classify the tone of the content and/or such words and phrases might be included in a text search. The search results are accordingly limited by the lack of consistency of sentiment expressed in the content and that it is difficult to separate negative ratings of content from things like content about negative topics.

BRIEF DESCRIPTION OF THE DRAWINGS

FIG. 1 is an example Sentiment Thesaurus built by an example Sentiment Framework System.

FIG. 2 is an example block diagram of an example embodiment of an example Sentiment Thesaurus Framework for producing and using a Sentiment Thesaurus.

FIGS. 4A-4C illustrate example entries of synonym sets for one valid sentiment word sense of the adjective "blunt," as stored in a WordNet® lexical database of English terms.

FIGS. 5A-5B illustrate example entries of synonym sets for a second valid sentiment word sense of the adjective "blunt," as stored in a WordNet® lexical database of English terms.

FIG. 7 illustrates an example resultant excerpt from a Sentiment Thesaurus according to an example embodiment of the Sentiment Thesaurus Framework.

DETAILED DESCRIPTION

Figure 3:
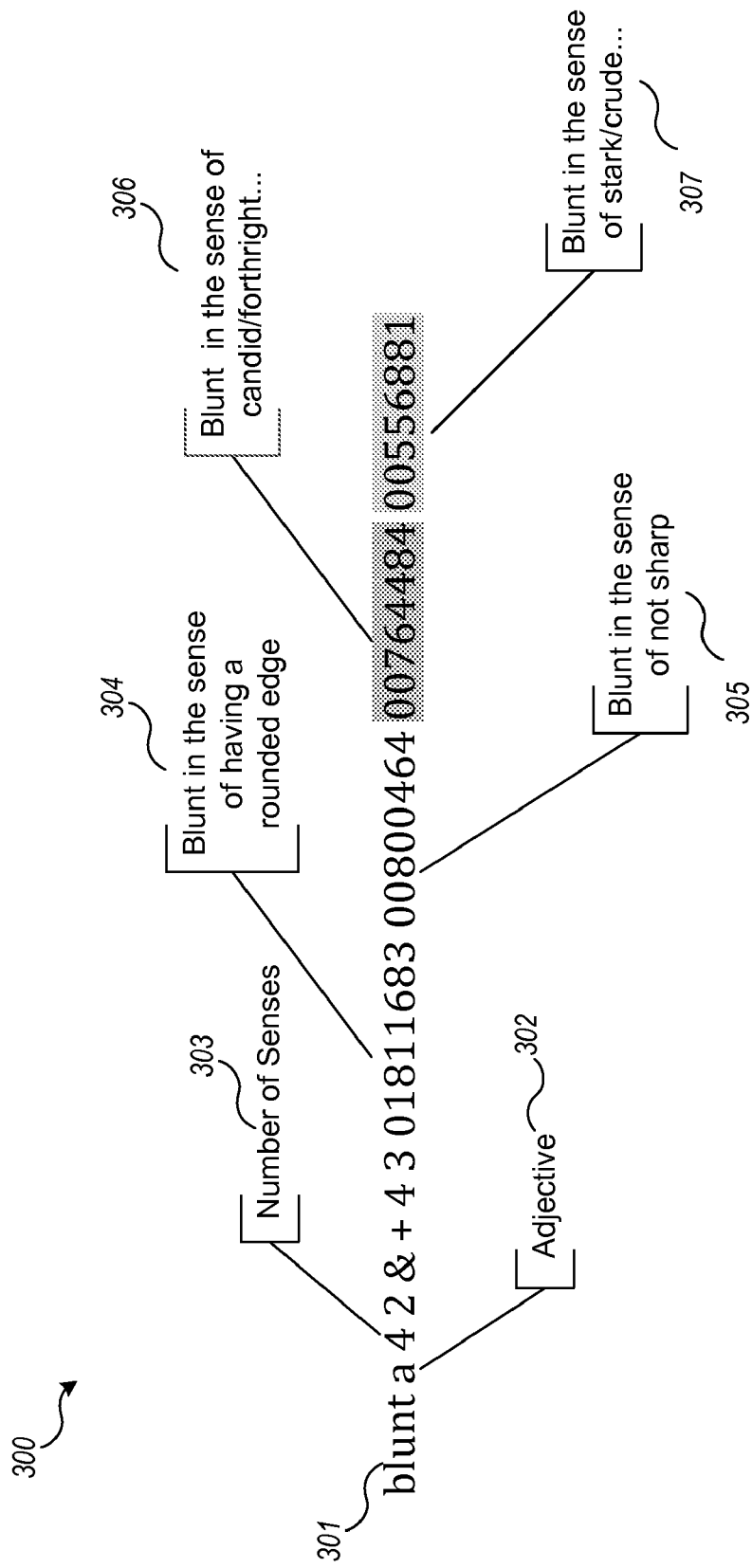
FIG. 3 illustrates an example entry of adjective word sense information for the adjective "blunt" as stored in a WordNet® lexical database of English terms.

Embodiments described herein provide enhanced computer- and network-based methods, systems and techniques for providing sentiment data to be used with electronic content. Example embodiments provide a Sentiment Thesaurus Framework ("STF") and STF System for generating a sentiment vocabulary and a sentiment thesaurus for use by downstream users and systems to obtain precise sentiment data to use in many different scenarios, including, for example, to rate, tag, organize, and/or find content. In exemplary embodiments, the STF evaluates adjectives according to a set of rules/heuristics and determines a sentiment vocabulary. The sentiment vocabulary preferably contains only adjectives, and in some embodiments, only the certain senses/meanings of these adjectives, that are valid sentiments. A set of rules/heuristics is used to determine sentiment words where each sentiment word can each describe an individual piece of content in and of itself. In such embodiments, some senses (meanings) of these same adjectives may not be valid sentiments even though some are valid. From this vocabulary and using a lexical database of relationships between adjectives, the STF then determines which words, or more precisely which meanings of words, are closely enough connected to be considered "synonyms" for purposes of inclusion in a sentiment thesaurus. In one embodiment, a set of connectedness rules that express allowable connectedness is used to determine valid synonymous relationships, hence synonyms. These rules dictate how large a shift in meaning or context may occur between adjectives (and/or adjective word senses) before they are no longer considered synonyms for the purpose of the sentiment thesaurus. Thus, the STF generates its own definition of what adjectives (or adjective word senses) are synonyms for the purpose of the thesaurus and what adjectives (or adjective word senses) are not.

A sentiment vocabulary and sentiment thesaurus may be used with structured content such as a book having discrete parts and/or with unstructured content, such as web blog postings, news rooms, etc. In some embodiments, the STF is provided to third party systems, for example, large electronic booksellers or other retailers, to generate and use sentiment data as away to describe content, such as to rate electronic content using a sentiment thesaurus, to tag content with opinion data in the form of sentiment adjectives, to search for content based upon sentiment tags and possibly other metadata, to access and display content along with sentiment data, and the like. Such third party systems can integrate the sentiment thesaurus and/or the techniques for generating and/or customizing its own sentiment thesaurus at many different levels, including, for example, to provide direct or indirect access to a sentiment thesaurus or to techniques for generating valid sentiment adjectives.

FIG. 1 is an example Sentiment Thesaurus built by an example Sentiment Framework System. Sentiment thesaurus 100 contains a set of sentiment entries 110a-110n formed from a sentiment vocabulary using the STF. Each sentiment entry, for example entry 110n, contains a valid sentiment adjective 121i (or valid sentiment adjective word sense of adjective 121i in those embodiments that operate on the granularity of different adjective meanings), a related adjective 131i related by the connectedness rules, and an indication of the connectedness rule 141i that defines how the related adjective 131i is a valid synonym of the valid sentiment adjective 121i. The sentiment thesaurus 100 is typically stored as a data structure in some type of computer memory and thus accessible to any program logic that can access that memory. For example, the sentiment thesaurus 100 may be represented as a data base, a file, an array, or any other type of known data structure for storing a data repository. The related adjectives 102 may contain valid and invalid adjectives (or adjective word senses) so that, upon inquiry using even an invalid adjective query, the sentiment thesaurus can retrieve and return one or more corresponding valid sentiment adjectives (or adjective word senses) 101. In this manner, a user can use the sentiment thesaurus to expand his or her sentiment vocabulary without concern for whether the returned word is considered a valid sentiment—because it will be.

For ease of discussion, this disclosure may refer to adjectives rather than adjective word-senses. A word sense refers to a particular semantic use, i.e., meaning, of a word. It is to be understood, however, that the techniques, methods, and systems described herein apply to either adjectives or adjective word-senses (individual meanings of adjectives). Some embodiments may operate on the granularity of word-senses of adjectives; others at the granularity of adjectives. In general, the description herein applies to both unless otherwise indicated. In addition, although described primarily with respect to adjective word-senses and to adjectives, the techniques of STF may be useful to create a variety of other tools as well, including vocabularies and thesaurus for different parts of speech and for different end uses. Also, although certain terms are used primarily herein, other terms could be used interchangeably to yield equivalent embodiments and examples. In addition, terms may have alternate spellings which may or may not be explicitly mentioned, and all such variations of terms are intended to be included.

In at least one embodiment that operates on the granularity of word-senses, the sentiment thesaurus is used generate valid adjective word senses that express sentiment. In a traditional thesaurus, typically all word senses of a single word are indicated as synonyms of a second word when the word itself is a synonym of the second word. In the sentiment thesaurus produced by the STF, only word senses that are considered valid, because, for example, they comply with a set of sentiment rules, are included as synonyms of another adjective word sense. In addition, the synonymic relationships are expanded to include certain shifts in meaning but not others; thereby expanding the notion of what is considered a synonym. These are dictated by the connectedness rules described further below.

FIG. 2 is an example block diagram of an example embodiment of an example Sentiment Thesaurus Framework for producing and using a Sentiment Thesaurus. In FIG. 2, a conglomeration of existing adjective meanings (word-senses) 201 is fed into a sentiment vocabulary generation engine 202 to determine which adjective word-senses meet valid sentiment criteria. Those adjective word-senses that meet valid sentiment criteria a grouped to form a sentiment vocabulary 203. The sentiment vocabulary is then fed through a thesaurus generation engine 205, which uses the vocabulary in conjunction with a lexical database that describes relationships between words, here adjective meanings, to provide a sentiment thesaurus 206, as described with reference to FIG. 1. In one embodiment, as described further below, WordNet® is used as a lexical database by the thesaurus generation engine 205 to determine which adjective word senses are related to which other adjective word senses and in what manner.

In one embodiment, the sentiment vocabulary generation engine 202 of the STF uses a set of fifteen rules/heuristics to determine whether an adjective word sense is or is not a valid sentiment. Other rules and/or other modifications of these rules may be similarly incorporated. Also, adaptations for a courser granularity of adjectives as opposed to adjective word-sense may also be applied. Specifically, according to one embodiment, adjective word senses are excluded from the generated sentiment vocabulary 203 if:

1. The adjective word-sense does not have a meaning or 'sense' that can describe an individual piece of content. (E.g., itchy, hunchbacked, crispy)
2. The adjective word-sense cannot describe a single noun in the online content without context provided by additional words. (E.g., analogous, native, involved, welcome, usable, juxtaposed, key, rightful)
3. The adjective word-sense is a number, spelled or otherwise. (E.g., eight, 6, fifteenth)
4. The adjective word-sense describes the content from a third person (or past tense syntax) perspective. (E.g., accepted, loved, opposed, glorified)
5. The adjective word-sense is limited to the predicative (after noun) or adjunctive (before noun) state in common usage. (E.g., prime, primo, amiss, blithe, pet)
6. The adjective word-sense describes content non-subjectively, in a manner than could describe virtually all pieces of content. (E.g., analyzable, classifiable, completed, distinct, existing, intentional, published)
7. The adjective word-sense describes the content in terms of its existing as a tangible thing. (E.g., affordable, biannual, certified, collectable, desirable, digital, gigantic, hard-backed, malfunctioning, mobile, multilingual)
8. The adjective word-sense describes the content as it relates to the world-at-large. (E.g., forbidden, exclusive, influential, new, notorious, obscure, official)
9. The adjective word-sense describes the content in a sense of categorization. (E.g., African, Christian, classical, communist, environmental, existentialist, futurist, documentary, educational, Hollywood)
10. The adjective word-sense describes the content in regards to its formal structure as a medium. (E.g., alphabetic, chronological, conversational, episodic, layered, rhyming)
11. The adjective word-sense is not a single word, but rather a lexical unit comprised of multiple words using spaces or hyphens.
(E.g., all-important, ad hoc, gung ho)
12. The adjective word-sense describes the content as undergoing or having undergone change. (E.g., active, budding, complete, diminished, extended, final, improved, modernized)
13. The adjective word-sense is an uncommon usage spelling variation of another adjective. (E.g., amateurish, anticlimactical, benignant, camp, digustful, energising)
14. The adjective word-sense has a negative prefix or suffix and has a meaning or 'sense' that is highly synonymous with another adjective that is part of the vocabulary. (E.g., un-, in-, -less, anti-)
15. The adjective word-sense anthropomorphizes the content as a proxy for the author in a manner that cannot describe the tonality of content. (E.g., accomplished, aggressive, timid, spiteful, smug, snide, shrewd, rude, proud)

The above listed rules mirror one example embodiment. Less, more, or different rules may be used by the thesaurus generation engine 105. Also, rules for inclusion may instead be incorporated instead of rules of exclusion. In addition, heuristics may be applied to exclude other word senses even though they pass the above rules, for example, to reduce confusion.

Once the sentiment thesaurus 206 is created, various third party content related tools 210 can incorporate the thesaurus 206 to implement sentiment related functionality. For example, a user 214 can use the tools 210 to access and display content using sentiment data, to tag content with sentiment, and/or to search content by sentiment.

Third party content related tools 220 that integrate the techniques and tools of the STF may take into account other aspects that help to derive usefulness from the sentiment data. For example, sentiment data is generally relevant only with respect to a context. For example, when applying the sentiment "humorous" to film, the classification of a movie as a comedy or a horror film will influence what humorous means—the sentiment of humorous may mean something different in the two scenarios. If one were to just search for films that are rated the most humorous, without respect to genre, a humorous horror film might never be returned as a result of the search for humorous films, since the percentage of humorous sentiment associated with horror films are likely a much lower number than the percentage of humorous sentiment associated with comedy films (i.e., all comedy films may be returned). For content that doesn't have naturally associated metadata (e.g., or other classifications) some kind of categorization for which to associate the sentiment also may need to be established to get meaningful results. A notion of currency also may influence how sentiment data influences results. Over time sentiment will change—it may affect how results are served up in, for example, a system that uses sentiment to determine information or to find things. Certain sentiments applicable at one point, like "cool," "hip," and "trendy," may later become "outdated," "corny," "old-fashioned," etc. Accordingly, sentiment data may be layered on top of other characterizing metadata, a notion of recency, etc.

As mentioned, in some embodiments the thesaurus generation engine 205 uses WordNet® as a lexical database to determine which adjective word senses are related to which other adjective word senses and in what manner. WordNet® is a publically available large lexical database of English. As described by its supplier:

> Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated [by following these relations] . . . . WordNet's structure is meant to provide a useful tool for computational linguistics and natural language processing.

Although explained in terms of the organization and information stored by WordNet®, other embodiments may use other public or proprietary lexical databases of English terms.

A lexical database such as WordNet® stores information for a variety of adjectives, whether or not they (or any of their meanings) comprise valid expressions of sentiment. FIG. 3 illustrates an example entry of adjective word sense information for the adjective "blunt" as stored in a WordNet® lexical database of English terms. Entry 300 shows a description for the word "blunt." The word "blunt" 301 includes an adjective indicator 302, followed by a number of senses 303 (here 4), followed by some additional information including an index 304-307 of each of the 4 senses. Each index 304-307 is a reference to an indicator in a data file that describes the relationships of that word-sense to other word-senses. Here, the four meanings of "blunt" include: blunt in the sense of having a rounded edge—sense 304; blunt in the sense of not sharp—sense 305; blunt in the sense of candid/forthright . . . —sense 306; and blunt in the sense of stark/crude . . . —sense 307.

Applying the 15 rules for excluding word senses from being valid sentiments, only two senses, sense 306 and sense 307 survive. That is, sense 304 of blunt meaning have a rounded edge, as used, for example, in the phrase "thick marks made by a blunt pencil," violates at least rule #7: the adjective word-sense describes content in terms of its existing as a tangible thing. Sense 305 of blunt meaning not sharp, as used, for example, in the phrase "a blunt instrument" also violates at least rule #7.

FIGS. 4A-4C illustrate example entries of synonym sets for one valid sentiment word sense of the adjective "blunt," as stored in a WordNet® lexical database of English terms. In particular, these entries correspond to the synonym sets for blunt as used in the sense of forthright, candid, etc. (sense 306 in FIG. 3). The entries pertaining to the other sense of blunt (sense 307) are described with reference to FIGS. 5A-5B. In particular, as shown in the entry 401 for the 00764901 index 402 for one word sense of the word "direct," 405, among other information, each entry contains its corresponding word-sense index 402, an indication 403 of whether the sense of the word is an adjective or a satellite adjective, a number of direct synonyms 404 in the synonym set, an indication of the word 405 of interest, and the number of related word-sense entries, for example related word-sense entry 407 (which points to a word-sense of "honest") and related word-sense entry 420 (which points to a word-sense of "blunt"). Thus, each entry describes a synonym set and other related word-senses of other words. The "direct" entry 401 indicates that there are no direct word-sense synonyms except the word itself, but that there are 13 related word sense entries.

Each related word-sense entry contains a pointer 411 indicating a type of relationship (called a "pointer" in WordNet®), an index 412 to the word-sense, and an indicator 413 of the part of speech. In the lexicon of WordNet® several pointers are available. The pointers demonstrated here and used in example embodiments of the connectedness rules are the """ pointer which indicates an "also-see" relationship and the "&" pointer which indicates a "similar to" relationship. The "!" pointer indicates an antonym relationship. To determine valid sentiment relationships to build the thesaurus, as will be described further below, the STF connectedness rules currently look to related word-sense entries that are adjectives and """ and "&" pointers. In other embodiments, other pointers and information may be used.

The """ relationship, the "also-see" relationship indicates a shift (subtle or otherwise) in the meaning of the indexed word-sense; whereas the "&" relationship, the "similar to" relationship, indicates a more specific meaning of the indexed word-sense. For example, for the indexed word-sense 00763901 402 of the adjective "direct," the word-sense 01222360 of the adjective "honest" is considered one shift in meaning. Whereas, the indexed word-sense 00764484 431 of the adjective "blunt" is considered a more specific meaning of the same word-sense of "direct." For the purposes of the STF, word-senses that indicate shifts in meaning occur between "axle" adjectives (adjective word-senses); whereas word-senses that yield more specificity in meaning are considered "spoke" adjectives (adjective word-senses) of their respective "axle" adjectives (adjective word-senses). WordNet® "adjectives" (see indicator 403) are "axle" adjectives according to the STF and WordNet® "satellite adjectives" (see indicator 433) are "spoke" adjectives according to the STF. These relationships are illustrated with respect to FIGS. 6A and 6B described below.

As also can be seen in FIGS. 4A-4C, the related word senses (11) shown in the entry 401 for the 00763901 index 402 for one word sense of the word "direct," an axle adjective, are listed as entries 410, 430, 440-447, 450, and 457. These fully describe the related adjective word-senses that comply with the STF connectedness rules to sense 306 of the word "blunt."

More specifically, the following eight connectedness rules/heuristics describe the spoke and axle connections that define the related adjectives 102 that related to a valid sentiment 101 in a sentiment thesaurus 100, as illustrated in FIG. 1:

(1) the word-sense itself;
(2) word-senses that share a sense with a valid sentiment (e.g., word-senses that share the same entry, such as "plain" and "unvarnished" in entry 444);
(3) word-senses that are related in a spoke-axle or axle-spoke connection;
(4) word-senses that are related via an axle-axle connection (e.g., one adjective sense is in an also-see relationship to another);
(5) word-senses that are related in a spoke-axle-spoke connection (that is they are related through an axle adjective);
(6) word-senses that are related in an axle-axle-spoke connection;
(7) word-senses that are related in a spoke-axle-axle connection; and
(8) word-senses that are related in a spoke-axle-axle-spoke connection (that is they are related through two axle adjectives).

The eighth connectedness rule indicates the most distant relationship that the STF uses to form a thesaurus entry. In exemplary embodiments, the STF provides synonymic relationships that convey at most one shift in meaning. That is, at most two axle adjective word-senses can connect a related adjective (word sense) to a valid sentiment adjective (word-sense). Other embodiments may employ different heuristics.

Thus, referring back to the entries illustrated in FIGS. 4A-4C, the word-sense blunt (sense 306 of FIG. 3) shown in entry 430 is a spoke adjective word-sense of the axle adjective word-sense "direct" 401. Entries for the word-sense for "bluff" 410, "brutal" 440, "flat-footed" 441, "man-to-man" 442, "no-nonsense" 443, "plain"/"unvarnished" 444, "pointed" 445, "square"/"straightforward"/"straight"446, and "upfront" 447 refer to other satellite adjectives (words-senses), or spokes, related to the 00764484 blunt word-sense 430 through the axle adjective (word-sense) entry 401 for "direct." Entry 450 for the axle adjective (word-sense) entry 450 for "honest" is related to the "blunt" entry 430 through the "direct" axle adjective (word-sense) entry 401 (an spoke-axle-axle connection). Entry 457 for the spoke adjective (word-sense) for "downright" is related to the "honest" entry 450; thus entry 430 for the "blunt" spoke adjective (word-sense) is related to entry 457 for the "downright" spoke adjective (word-sense) through two axle adjectives—only one shift in meaning has occurred between the indicated word-senses "direct" and "honest." These connectedness relationships are illustrated in FIG. 6A.

FIGS. 5A-5B illustrate example entries of synonym sets for a second valid sentiment word sense of the adjective "blunt," as stored in a WordNet® lexical database of English terms. These entries correspond to the relationships supported by the eight connectedness rules as applied to the word-sense of blunt meaning stark or crude (sense 307 in FIG. 3). In this case, the entry 515 for the "blunt" spoke adjective (word-sense) is connected to (is a more specific meaning) of the entry 510 for the "unconditional"/"unconditioned" axle adjective (word-sense). Entry 516 for the "vested" adjective (word-sense) represents another spoke connection to entry 510. Entry 520 for the "unqualified" adjective (word-sense) represents an axle to axle connection to the entry for the "blunt" adjective word-sense (valid sentiment). Entries 530-533 represent other spoke connections to other adjective word senses related to the "blunt" valid sentiment through two axle connections. These relationships are illustrated in the map provided in FIG. 6B.

Figure 6A:
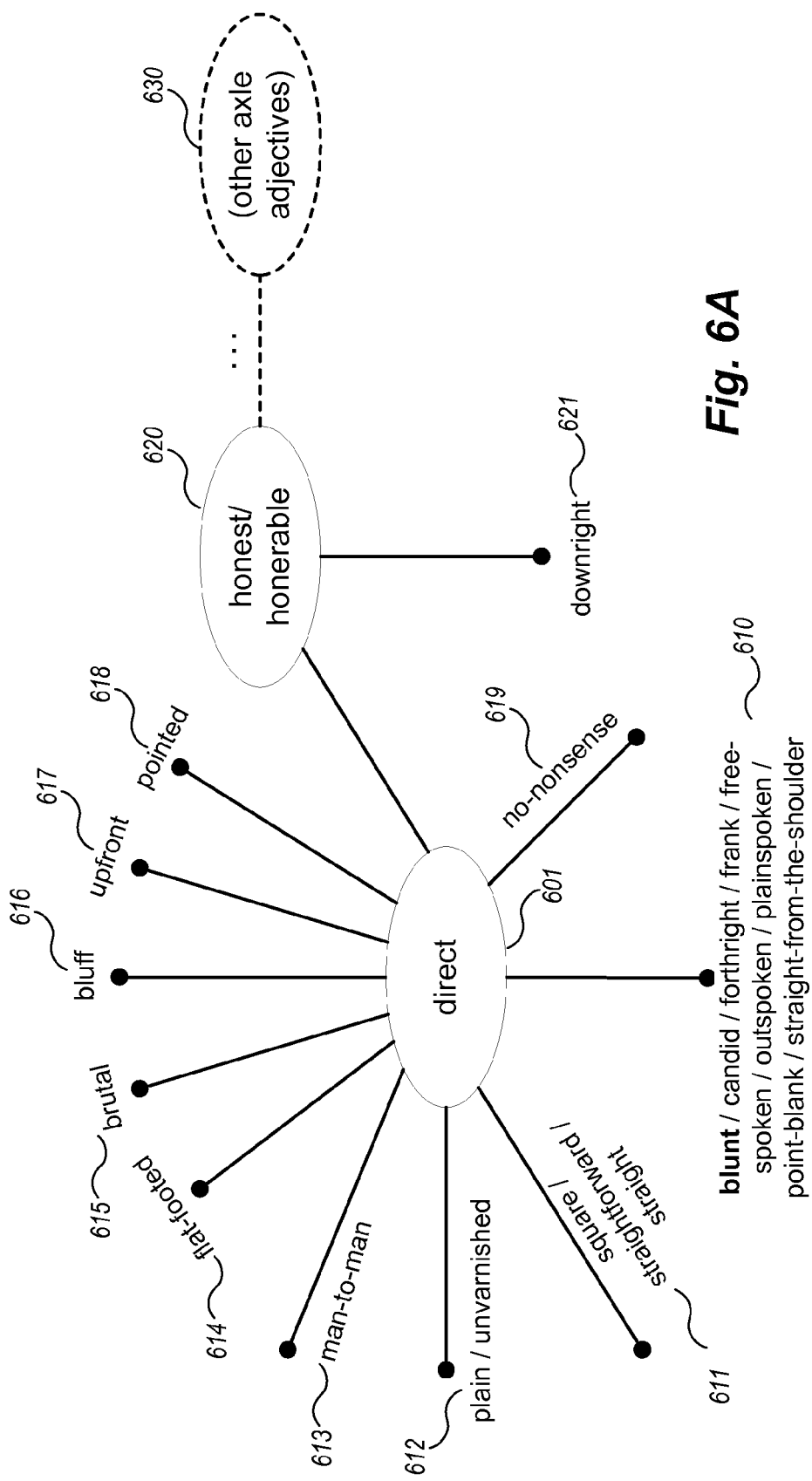
FIGS. 6A-6B are example block diagrams illustrating mappings of the synonym sets shown in FIGS. 4A-4C and 5A-5B.
Figure 6B:
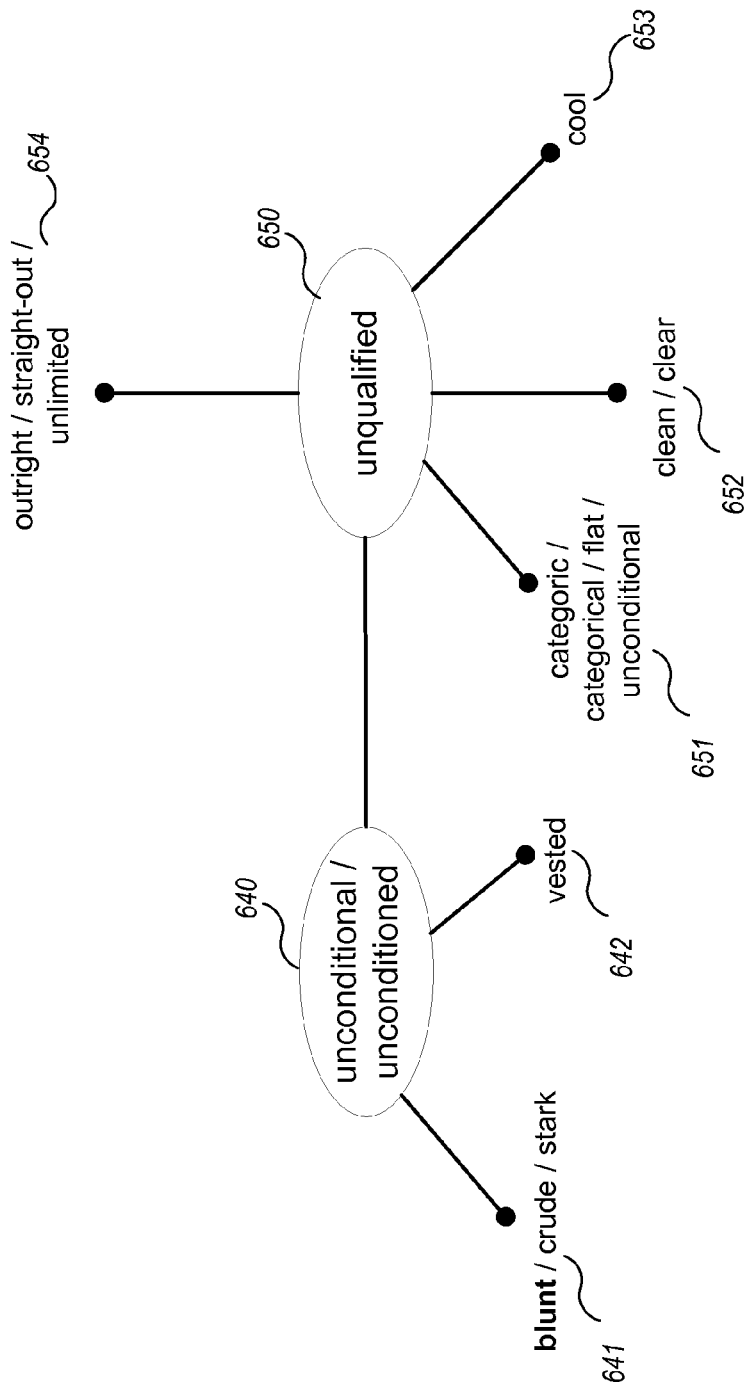

FIGS. 6A-6B are example block diagrams illustrating mappings of the synonym sets shown in FIGS. 4A-4C and 5A-5B. As mentioned, the connectedness rules of the STF dictate which adjective word-senses are related to which other adjective word-senses for the purpose of generating a sentiment thesaurus. As also described, in one embodiment these rules dictate that at most two axle adjectives can create a relatedness connection between a valid sentiment (adjective/adjective word-sense) and another related adjective. Accordingly, this embodiment of the connectedness rules dictates that at most one shift in meaning can occur. As an example, spoke adjective "square" 611 is related to spoke adjective "bluff" 616 through one axle adjective "direct" 601. No "shifts in meaning" (between axle adjectives) have occurred—both are more specific meanings of the word "direct." However, as another example, spoke adjective "square" 611 is related to axle adjective "honest" 620 through two axle adjectives: "direct" 601 and "honest" 620. Accordingly, one shift in meaning has occurred. As yet another example, spoke adjective "downright" 621 is related to spoke adjective "bluff" 616 through the same two axle adjectives: "honest" 620 and "direct" 601. Thus, again one shift in meaning has occurred. And, as the figure shows, although axle adjective "honest" 620 is connected to other axle adjectives (e.g., adjective 630), the STF considers this too distant a connection for this particular embodiment of the sentiment thesaurus.

FIG. 6B contains a similar illustration of the mappings of the word-senses of the adjectives related to the other word sense of "blunt" that is a valid sentiment ("stark"/"crude," etc.) according to a connectedness relationship supported by the STF rules. Again, as mentioned, other connectedness rules may be incorporated.

FIG. 7 illustrates an example resultant excerpt from a Sentiment Thesaurus according to an example embodiment of the Sentiment Thesaurus Framework. The illustrated excerpt corresponds to the two valid sentiment word-senses of the word "blunt" (sense 306 and 307 of FIG. 3) and their related adjective word-senses as determined by the connectedness rules 1-8. As described also with respect to FIG. 1, each entry contains an indication of sentiment, here a sentiment word-sense indicator 730 and the adjective name 740, and indication of a related adjective, here word-sense indicator 750 and the adjective name 760, and an indication of the connectedness rule 770. For example, sentiment entry 701 corresponds to the word-sense "blunt" (in the sense of candid) itself, which corresponds to connectedness rule 1. Sentiment entries 702 contain all of the synonyms of that word-sense of blunt, as described in lexical database entry 430 in FIG. 4A. These include entries for the words candid, forthright, frank, free-spoken, outspoken, plainspoken, point-blank, and straight-from-the-shoulder. Each of these entries show a connectedness rule #2 in column 770, which corresponds to the word-senses that share the same word-sense as a valid sentiment. Sentiment entry 703 corresponds to how blunt is connected to the word-sense of direct, which is a spoke-axle connection, as indicated by connectedness rule #3 in column 770. Sentiment entries 704 correspond to how the word-senses of honest and honorable are related to the word sense of blunt, which is an axle-axle-spoke connection (from point of view of relationship of column 760 to column 740), as indicated by connectedness rule #6 in column 770. Sentiment entries 706 correspond to how the word-senses of bluff through upfront are related to the word-sense of blunt, which are through spoke-axle-spoke connections (through the word sense of direct), as indicated by connectedness rule #5 in column 770. The remaining thesaurus entries for word-senses that correspond to the 4$^{th}$ meaning of blunt (entries 707-712) are similarly represented.

Of note, the word-senses of adjectives in column 760 need not be valid sentiments themselves—part of the role of the thesaurus is to guarantee access to a valid sentiment, even when an adjective is entered that is not a valid sentiment. In the excerpt illustrated in FIG. 7, the only adjective word-senses that are valid sentiments (because they pass the 15 exclusionary rules) are: 00764484 blunt, 00764484 candid, 00764484 forthright, 00764484 frank, 00763901 direct, 01222360 honest, 01222360 honorable, 00765173 brutal, 00556881 blunt, and 00556881 crude. Yet, using the sentiment thesaurus, these valid sentiments can be retrieved even if an adjective that is not a sentiment is looked up in the sentiment thesaurus. The related adjective word-senses (in column 760) that are not valid sentiments break any number of the 15 rules (i.e., match the exclusionary rules), including rules 2, 11, and 15. Also, again as noted the example excerpt includes word-senses of the various adjectives. In other embodiments, the adjectives themselves are used—any valid word sense of an adjective will yield a valid sentiment adjective.

Example embodiments described herein provide applications, tools, data structures and other support to implement an STF to be used to derive a sentiment vocabulary and/or a sentiment thesaurus. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 8:
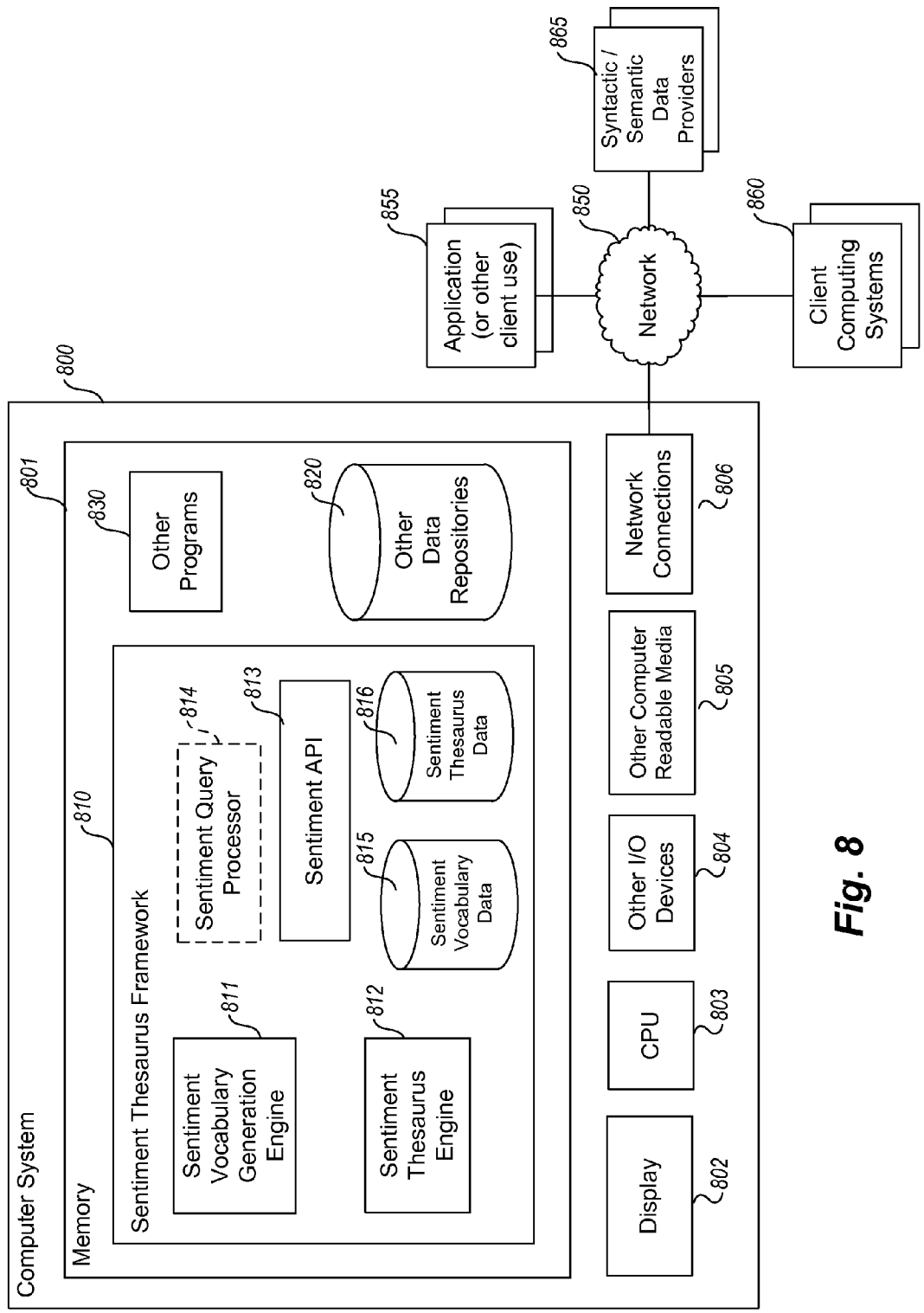
FIG. 8 is an example computing system that may be used to practice embodiments of a Sentiment Thesaurus Framework.

FIG. 8 is an example computing system that may be used to practice embodiments of a Sentiment Thesaurus Framework. Note that a general purpose or a special purpose computing system suitably instructed may be used to implement an STF. Further, the STF may be implemented in software, hardware, firmware, or in some combination to achieve the capabilities described herein.

The computing system 800 may comprise one or more server and/or client computing systems and may span distributed locations. In addition, each block shown may represent one or more such blocks as appropriate to a specific embodiment or may be combined with other blocks. Moreover, the various blocks of the Sentiment Thesaurus Framework 810 may physically reside on one or more machines, which use standard (e.g., TCP/IP) or proprietary interprocess communication mechanisms to communicate with each other.

In the embodiment shown, computer system 800 comprises a computer memory ("memory") 801, a display 802, one or more Central Processing Units ("CPU") 803, Input/Output devices 804 (e.g., keyboard, mouse, CRT or LCD display, etc.), other computer-readable media 805, and one or more network connections 806. The STF 810 is shown residing in memory 801. In other embodiments, some portion of the contents, some of, or all of the components of the STF 810 may be stored on and/or transmitted over the other computer-readable media 805. The components of the STF 810 preferably execute on one or more CPUs 803 and manage the generation of a sentiment vocabulary and sentiment thesaurus, as described herein. Other code or programs 830 and potentially other data repositories, such as data repository 820, also reside in the memory 801, and preferably execute on one or more CPUs 803. Of note, one or more of the components in FIG. 8 may not be present in any specific implementation. For example, some embodiments embedded in other software may not provide means for user input or display.

In a typical embodiment, the STF 810 includes one or more sentiment vocabulary generation engines 811, one or more sentiment thesaurus (generation) engines 812, sentiment vocabulary data 815, and sentiment thesaurus data 816. As describe with reference to FIG. 2, the sentiment vocabulary generation engine 811 are responsible for generating a valid sentiment vocabulary based upon a set of rules, for example the 15 exclusionary principles. The sentiment thesaurus engine 812 builds a sentiment thesaurus 816 based upon a lexical dictionary and the sentiment vocabulary 815. Techniques for building the sentiment thesaurus are described with reference to FIGS. 9 and 10.

In some embodiments a sentiment application programming interface (API) 813 is made available to access the vocabulary data 815, thesaurus data 816, and the techniques for generating the same. In addition, in some embodiments a sentiment query processor 814 is supported which provides an interface for retrieving valid sentiments from the thesaurus data 816. In at least some embodiments, various components are provided external to the STF system and are available, potentially, over one or more networks 850. Other and/or different modules may be implemented. In addition, the STF may interact via a network 850 with application or client code 855 that incorporates aspects of the STF, one or more client computing systems 860 that utilize the vocabulary 815, thesaurus 816, etc., and/or one or more third-party syntactic/semantic data providers 865 that may provide, for example, a lexical database for use in creating the thesaurus 816. Also, of note, the sentiment thesaurus data repository 816 and/or the sentiment vocabulary data repository 815 may be provided external to the STF as well, for example in a knowledge base accessible over one or more networks 850.

In an example embodiment, components/modules of the STF 810 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an STF implementation.

In addition, programming interfaces to the data stored as part of the STF 810 (e.g., in the data repositories 815 and 816) can be available by standard means such as through C, C++, C#, and Java APIs; libraries for accessing files, databases, or other data repositories; through scripting languages such as XML; or through Web servers, FTP servers, or other types of servers providing access to stored data. The vocabulary and thesaurus data repositories 815 and 816 may be implemented as one or more database systems, file systems, or any other method known in the art for storing such information, or any combination of the above, including implementation using distributed computing techniques.

Also the example STF 810 may be implemented in a distributed environment comprising multiple, even heterogeneous, computer systems and networks. For example, in one embodiment, the sentiment vocabulary engine 811, the sentiment thesaurus engine 812, and the thesaurus data repository 816 are all located in physically different computer systems. In another embodiment, various modules of the STF 810 are hosted each on a separate server machine and may be remotely located from the tables which are stored in the vocabulary and thesaurus repositories 815 and 816. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions of an STF.

Furthermore, in some embodiments, some or all of the components of the STF may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine readable software instructions or structured data) on a computer-readable medium (e.g., a hard disk; a memory; a network; or a portable media article to be read by an appropriate drive or via an appropriate connection). Some or all of the system components and data structures may also be transmitted via generated data signals (e.g., as part of a carrier wave or other analog or digital propagated signal) on a variety of computer-readable transmission mediums, such as media 805, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computing system configurations.

Figure 9:
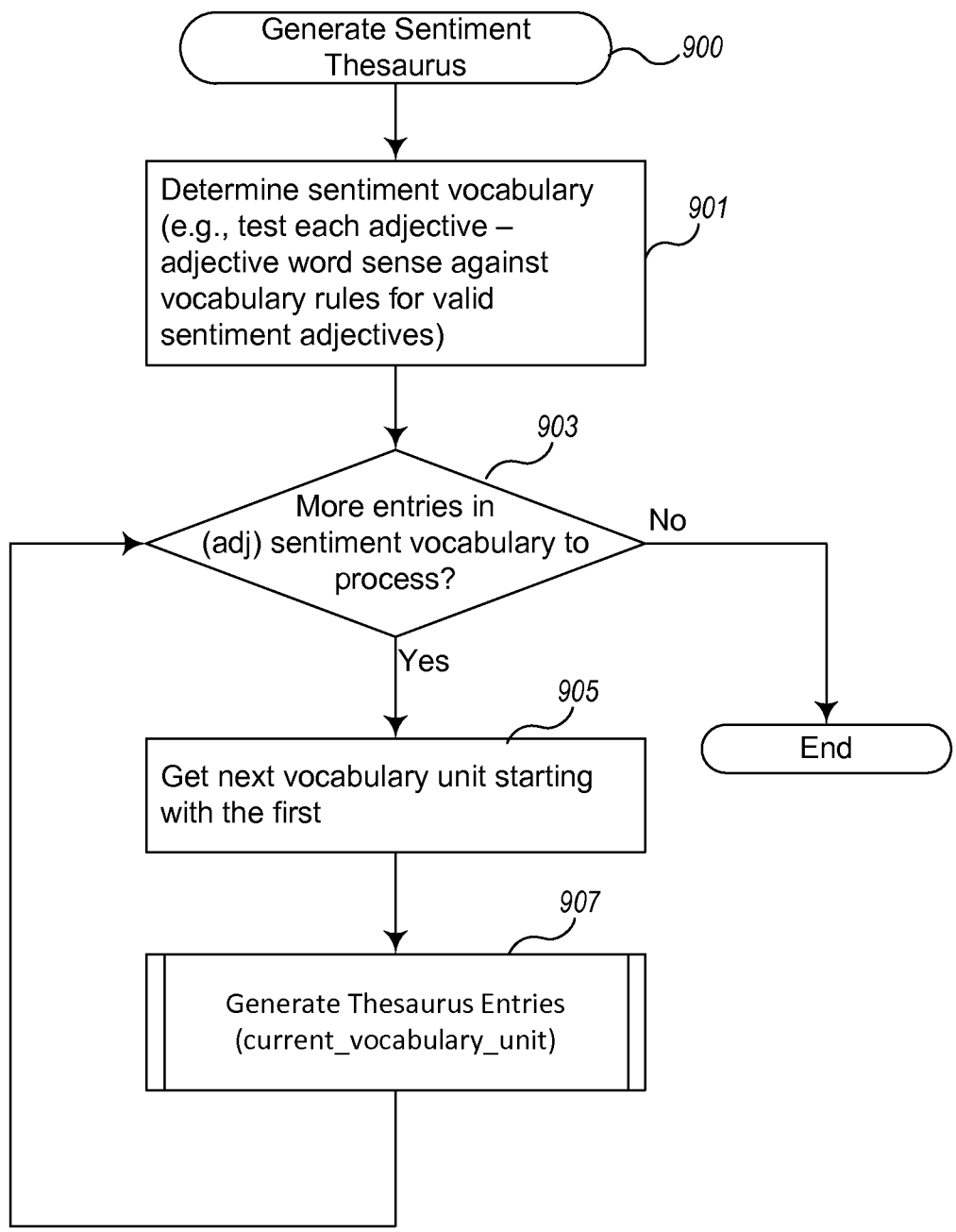
FIG. 9 is an example flow diagram of an overview process for generating a Sentiment Thesaurus according to an example embodiment.

FIG. 9 is an example flow diagram of an overview process for generating a Sentiment Thesaurus according to an example embodiment. Such program logic may be executed, for example, by the sentiment thesaurus engine 812 in FIG. 8 to build a sentiment thesaurus as described above. In block 901, the process determines a sentiment vocabulary from a set of potential words or word-senses (e.g., adjectives or adjective word-senses) by examining each potential word against the rules to determine whether it should be excluded or not. In blocks 903-907, the process performs a loop to determine for each valid sentiment adjective (adjective word-sense), what related adjectives (adjective word-senses) to add into the thesaurus. In particular, in block 903, the process determines whether there are more valid sentiment words to process, and, if so, continues in block 905, else ends. In block 905, the process determines the next valid sentiment in the vocabulary to process. In block 907, the process performs additional logic to process all of the entries in a lexical database that might be related to the current vocabulary word, in order to determine whether to add them to the sentiment thesaurus result.

Figure 10:
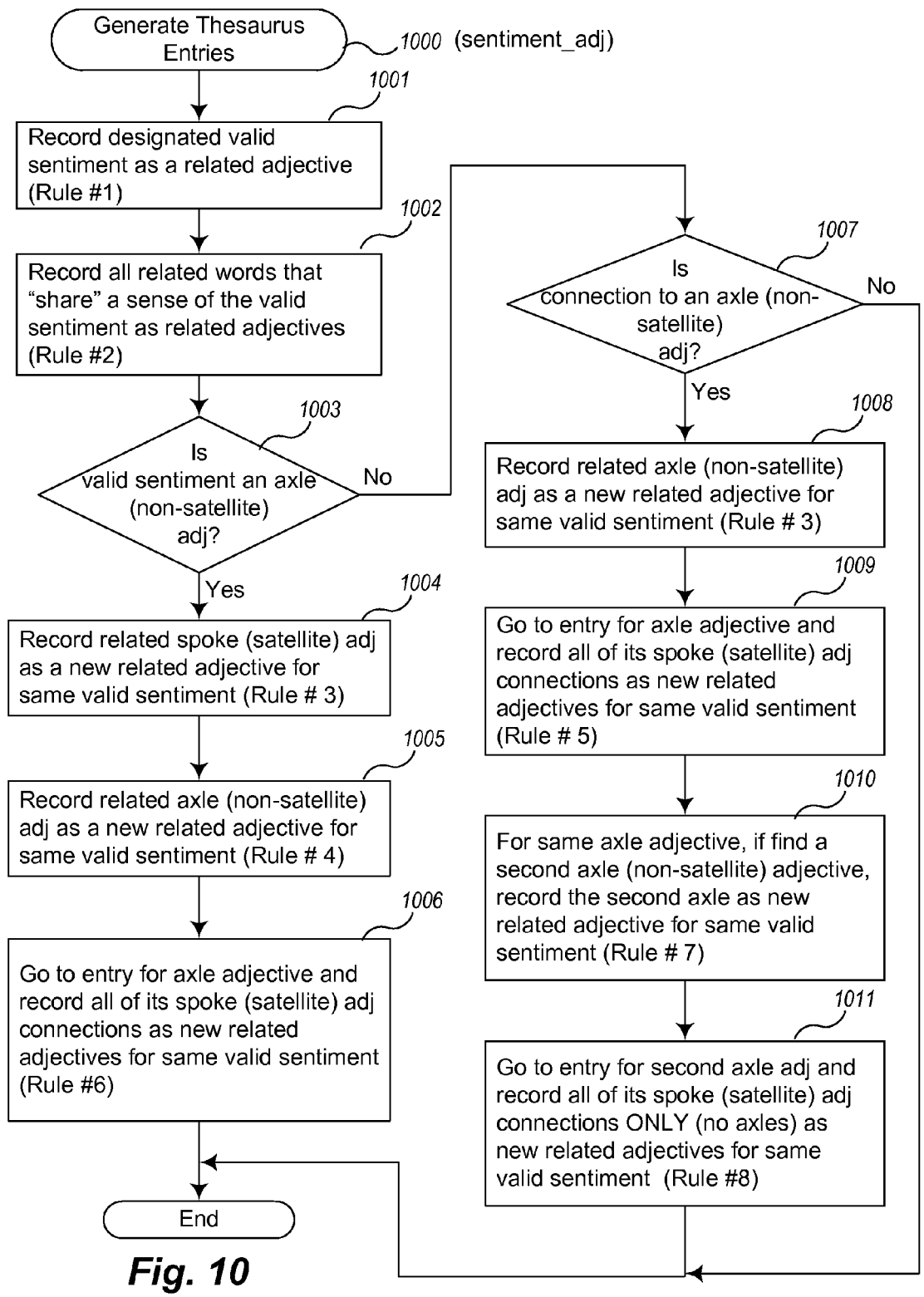
FIG. 10 is an example flow diagram of a process for generating entries in a Sentiment Thesaurus for each valid sentiment adjective, according to an example embodiment.

FIG. 10 is an example flow diagram of a process for generating entries in a Sentiment Thesaurus for each valid sentiment adjective, according to an example embodiment. The logic illustrated by FIG. 10 is performed for each valid sentiment (word-sense/word in the vocabulary) and processes the lexical database looking for related adjectives that meet the connectedness criteria. In particular, in block 1001, the process first records the designated valid sentiment as a thesaurus entry (corresponding to connectedness rule #1). In block 1002, the process records all related words that share the sense of the valid sentiment as related adjectives (according to connectedness rule #2). These are synonyms of the valid sentiment as they share the same sense. In block 1003, the process determines whether the designated valid sentiment is itself a spoke (satellite) or axle (non-satellite) adjective in order to continue processing. If the designated valid sentiment is a spoke, the process continues in block 1006 (it can find relationships that are connected via two axle adjectives), otherwise, if the designated valid sentiment is itself an axle, the process continues in block 1004. In block 1004, the process records any related spoke adjectives as new related adjectives (connectedness rule #3). In block 1005, the process records any related axle adjectives (one shift in meaning is allowed under connectedness rule #4, axle-axle) and continues in block 1006. In block 1006, the process records any spokes of the related axle adjective as new related adjectives (connectedness rule #6, axle-axle-spoke). If at any block no such relationships exist, the process continues to the next block. For example, some axle adjectives may be stand alone and not connected to any other axle or spoke adjectives.

In block 1007, when the process has determined that the designated valid sentiment is a spoke (satellite) adjective, the process then determines whether a potential related adjective is an axle adjective. If so, the process continues at block 1008, otherwise ends. In block 1008, the process records the axle adjective as a new related adjective (is a spoke-axle connection under connectedness rule #3). In block 1009, the process determines from the lexical database whether there is a related axle adjective and if so, searches its entry to determine and record all of its spoke (satellite) adjective connections (under connectedness rule #5: spoke-axle-spoke connections). Then, in block 1010, for the same axle adjective, if the process determines the existence of another axle adjective, then it records that as a new related adjective under connectedness rule #7 (spoke-axle-axle). This is permitted as the connection represents one shift in meaning. In block 1011, the process records as related adjectives any related spoke adjectives to the axle adjective determined in block 1010 under connectedness rule #8 (spoke-axle-axle-spoke), and then ends or continues other processing.

At this point, the process has searched the lexical database starting with the designated valid sentiment adjective (word-sense) and determined all related adjective word-senses that meet the connectedness rules for inclusion in the sentiment thesaurus.

From the foregoing it will be appreciated that, although specific embodiments have been described herein for purposes of illustration, various modifications may be made without deviating from the spirit and scope of the present disclosure. For example, the methods, systems, and techniques for generating sentiment data discussed herein are applicable to other architectures other than those that take advantage of a WordNet® database architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A non-transitory computer-readable storage medium containing structured data for use with computer program code executing on a computer processor, comprising:

a sentiment thesaurus data structure stored in the storage medium and including data used by the computer program code, when executed, to generate one or more valid sentiments related to an indicated input word, the valid sentiments selected based upon an evaluation of a set of rules that define valid sentiments, the data structure comprising:

a plurality of sentiment entries, each entry containing an indication of one of a plurality of valid sentiment adjectives that can be used to express one of the valid sentiments applicable to online content, the valid sentiments selected based upon the evaluation of the set of rules that define valid sentiments, an indication of an adjective related to the valid sentiment adjective of the sentiment entry, and a connection type indicator that characterizes a semantic relationship between the related adjective and the valid sentiment adjective that is within a specified permissible degree of distance in meaning, the indicated connection type being one of a plurality of permitted connection types that limit a degree of distance in meaning between adjectives.

2. The computer-readable storage medium of claim 1 wherein the computer program code, when executed, generates from the sentiment thesaurus data structure one or more valid sentiments related to an indicated input word by looking up each sentiment entry in which the indicated input word is stored as a related adjective and retrieving an indication to the related valid sentiment adjective.

3. The computer-readable storage medium of claim 2 wherein the computer program code, when executed, returns related valid sentiment adjectives in an order corresponding to the indicated connection type associated with each sentiment entry of each related valid sentiment adjective.

4. The computer-readable storage medium of claim 1 wherein the plurality of permitted connection types include semantic relationships that specify a maximum of one shift in meaning between words.

5. The computer-readable storage medium of claim 1 wherein the plurality of permitted connection types include semantic relationships that specify a first and a second word having a similar meaning, where the first word is a more specific description of the second word.

6. The computer-readable storage medium of claim 1 wherein the plurality of permitted connection types include semantic relationships that specify that two adjectives are connected in a "similar to" relationship and/or semantic relationships that specify that two adjectives relate to each other through at most two "also see" relationships.

7. The computer-readable storage medium of claim 1 wherein the plurality of permitted connection types include semantic relationships that specify that two adjectives are connected via a maximum of two non-satellite adjectives.

8. The computer-readable storage medium of claim 1 wherein the plurality of permitted connection types include semantic relationships that represent one shift in meaning from a related adjective to a related valid sentiment adjective.

9. The computer-readable storage medium of claim 1 wherein the plurality of permitted connection types include semantic relationships that represent that a related adjective has a meaning similar to a related valid sentiment adjective.

10. The computer-readable storage medium of claim 1 wherein the plurality of permitted connection types comprise semantic relationships that specify that a related adjective can relate to a valid sentiment adjective as one or more of matching, as sharing a valid sense, as sharing a spoke-axle connection to a valid sense, as sharing an axle-axle connection to a valid sense, as sharing a spoke-axle-spoke connection to a valid sense, as sharing an axle-axle-spoke connection to a valid sense, as sharing a spoke-axle-axle connection to a valid sense, or as sharing a spoke-axle-axle-spoke connection to a valid sense.

11. The computer-readable storage medium of claim 1 wherein one or more of the plurality of sentiment entries include a related adjective that is not a valid sentiment, such that the thesaurus data structure may be used by the computer program code to retrieve one or more related valid sentiment adjectives in response to an indicated input word that is not a valid sentiment.

12. The computer-readable storage medium of claim 1 wherein the plurality of sentiment entries correspond to an electronically stored data repository that stores a vocabulary of sentiment adjectives produced by analyzing a universe of adjectives according to a set of rules that determine whether each adjective may be usable as a valid expression of sentiment for online content.

13. The computer-readable storage medium of claim 12 wherein the set of rules employed to determine whether each sense of an adjective may be usable as a valid expression of sentiment for online content comprises:
one or more of:
a rule that excludes a sense of an adjective from the set if the adjective does not have a meaning that can describe an individual piece of content;
a rule that excludes a sense of an adjective from the set if the adjective cannot describe a single noun in the online content without context provided by additional words of the online content;
a rule that excludes a sense of an adjective from the set if the adjective is a number;
a rule that excludes a sense of an adjective from the set if the adjective describes content from a third person perspective;
a rule that excludes a sense of an adjective from the set if the adjective is limited to the predicative or adjunctive state in common usage of the adjective;
a rule that excludes a sense of an adjective from the set if the adjective describes content non-subjectively in a manner that could describe all content;
a rule that excludes a sense of an adjective from the set if the adjective describes content as if existing as a tangible thing;
a rule that excludes a sense of an adjective from the set if the adjective describes content as related to a world-at-large;
a rule that excludes a sense of an adjective from the set if the adjective describes content in a sense of categorization;
a rule that excludes a sense of an adjective from the set if the adjective describes content in regard to formal structure of a content as a medium;
a rule that excludes a sense of an adjective from the set if the adjective is not a single word and is a lexical unit comprised of multiple aggregated words;
a rule that excludes a sense of an adjective from the set if the adjective describes content as undergoing or having undergone change;
a rule that excludes a sense of an adjective from the set if the adjective is an uncommon usage spelling variation of another adjective;
a rule that excludes a sense of an adjective from the set if the adjective has a negative prefix or suffix and has a meaning that is synonymous with an adjective already included in the vocabulary; and/or a rule that excludes a sense of an adjective from the set if the adjective anthropomorphizes corresponding content as a proxy for the author in a manner that fails to describe tonality of the corresponding content.

14. The computer-readable storage medium of claim 1 wherein the storage medium is a memory in a computing system.

15. The computer-readable storage medium of claim 1 wherein the data structure is accessible over a wide-area or local-area network.

16. A computer-implemented method for using a sentiment thesaurus stored according to the computer-readable storage medium of claim 1 to retrieve sentiment words for use with online content, comprising:
receiving an indication of an adjective;
determining from the sentiment thesaurus one or more related sentiment adjective word-senses that relate to the indicated adjective, by looking up the indicated adjective and retrieving related sentiment adjective word-senses; and
returning indications to the retrieved related sentiment adjective word-senses.

17. The method of claim 16 wherein the retrieved related sentiment adjectives are returned in an order.

18. The method of claim 17 wherein the order is based upon a connection type stored for the indicated adjective in relation to each related sentiment adjective word-sense.

19. The method of claim 17 wherein the order returns related sentiment adjective word-senses that are more closely related before those that are more distantly related, as determined based upon a set of connection rules.

20. The method of claim 16 wherein the looking up the indicated adjective and retrieving related sentiment adjective word-senses further comprises:
determining a set of related sentiment adjective word-senses that correspond to the indicated adjective based upon an indicated connection type or a range of connection types; and
returning the determined related sentiment adjective word-senses.

21. The method of claim 20 wherein the indicated connection type or the range of connection types indicates only connections where more specificity of meaning is occurring.

22. The method of claim 20 wherein the indicated connection type or the range of connection types indicates relationships in which the indicated adjective matches a valid sentiment adjective word sense or shares a sense with the valid sentiment adjective word sense.

23. The method of claim 16 wherein the returned indicated related sentiment adjective word-senses are presented in a list of viable sentiment words.

24. The method of claim 16 wherein one or more of the returned indicated related sentiment adjective word-senses are incorporated to tag the online content.

25. The method of claim 16 wherein the returned indicated related sentiment adjective word-senses are used for searching online content.

26. The method of claim 16 wherein the returned indicated related sentiment adjective word-senses are used to access and display content with opinion data reflecting one or more of the indicated related sentiment adjective word senses.

27. A computer-implemented method for facilitating the production of an online thesaurus used to generate sentiment data for online content, comprising:
generating and storing in a computer memory a plurality of valid sentiment adjective word-senses in a vocabulary data repository by determining whether each adjective from a set of possible adjectives is a valid sentiment based at least upon evaluation of a set of rules that define valid sentiments; and for each generated valid sentiment adjective word-sense,
determining a set of related adjectives that meets a plurality of connection rules that limit, for each related adjective in the set, a degree of distance in meaning between the related adjective and the valid sentiment adjective word-sense; and storing, in a thesaurus data structure in a computer memory, the set of related adjectives, along with indications of the plurality of connection rules that have been met, to correspond with the valid sentiment adjective word-sense, such that, responsive to an indication of one of the related adjectives, the valid sentiment adjective word-sense can be retrieved.

28. The method of claim 27 wherein the thesaurus data structure is stored in a table.

29. The method of claim 27 wherein the plurality of connection rules specify that two adjectives can be related if they represent no more than one shift in meaning.

30. The method of claim 27 wherein the plurality of connection rules specify that a related adjective can relate to a valid sentiment adjective word-sense as matching, as sharing a valid sense, as sharing a spoke-axle connection to a valid sense, as sharing an axle-axle connection to a valid sense, as sharing a spoke-axle-spoke connection to a valid sense, as sharing an axle-axle-spoke connection to a valid sense, as sharing a spoke-axle-axle connection to a valid sense, or as sharing a spoke-axle-axle-spoke connection to a valid sense.

31. The method of claim 27 wherein the set of rules used for determining whether each adjective from the set of possible adjectives is a valid sentiment comprises:
one or more of:
a rule that excludes a sense of the adjective if the adjective word sense does not have a meaning that can describe an individual piece of content;
a rule that excludes a sense of the adjective if the adjective word sense cannot describe a single noun in the online content without context provided by additional words of the online content;
a rule that excludes a sense of the adjective if the adjective word sense is a number;
a rule that excludes a sense of the adjective if the adjective word sense describes content from a third person perspective;
a rule that excludes a sense of the adjective if the adjective word sense is limited to the predicative or adjunctive state in common usage of the adjective;
a rule that excludes a sense of the adjective if the adjective word sense describes content non-subjectively in a manner that could describe all content;
a rule that excludes a sense of the adjective if the adjective word sense describes content as if existing as a tangible thing;
a rule that excludes a sense of the adjective if the adjective word sense describes content as related to a world-at-large;
a rule that excludes a sense of the adjective if the adjective word sense describes content in a sense of categorization;
a rule that excludes a sense of the adjective if the adjective word sense describes content in regard to formal structure of a content as a medium;
a rule that excludes a sense of the adjective if the adjective word sense is not a single word and is a lexical unit comprised of multiple aggregated words;
a rule that excludes a sense of the adjective if the adjective word sense describes content as undergoing or having undergone change;
a rule that excludes a sense of the adjective if the adjective word sense is an uncommon usage spelling variation of another adjective;
a rule that excludes a sense of the adjective if the adjective word sense has a negative prefix or suffix and has a meaning that is synonymous with an adjective already included in the vocabulary; and/or
a rule that excludes a sense of the adjective if the adjective word sense anthropomorphizes corresponding content as a proxy for the author in a manner that fails to describe tonality of the corresponding content.

* * * * *